3,467,577
WATER MODERATED AND COOLED NUCLEAR
REACTOR POWER PLANT
Franz Winkler, Erlangen, Germany, assignor to Siemens
 Aktiengesellschaft, Erlangen, Germany, a corporation
 of Germany
Filed Aug. 11, 1966, Ser. No. 571,773
Claims priority, application Germany, Aug. 13, 1965,
S 98,818
Int. Cl. G21c 15/02, 15/00
U.S. Cl. 176—55                          1 Claim

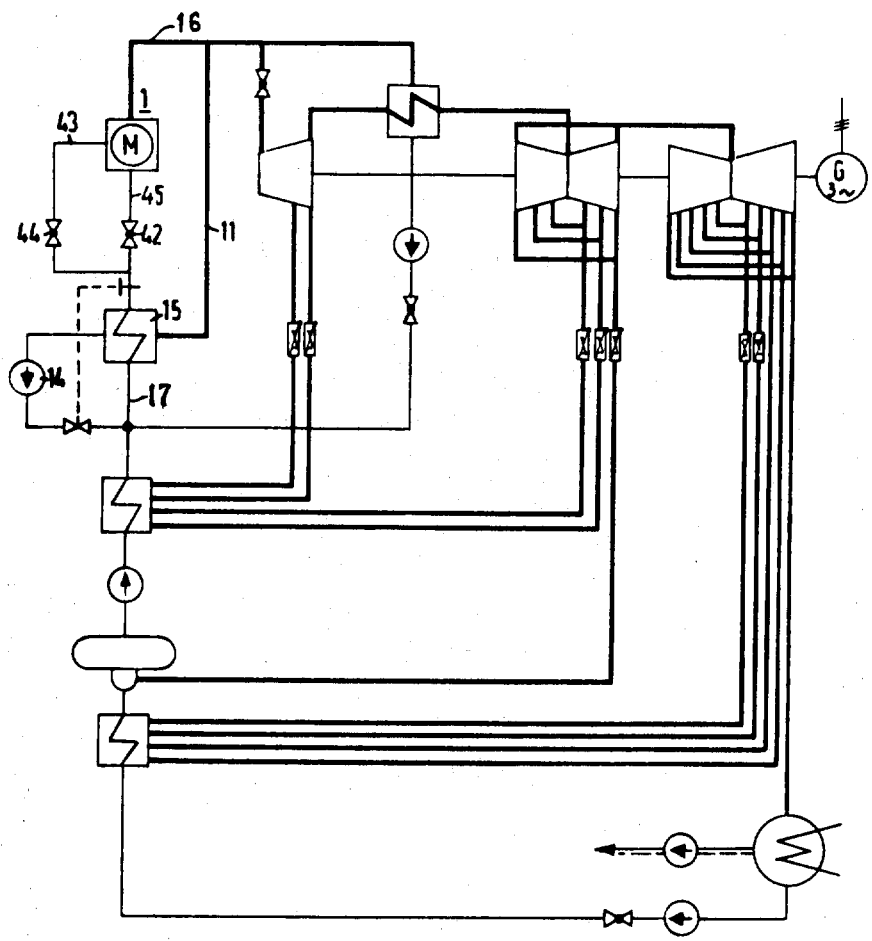

ABSTRACT OF THE DISCLOSURE

Heterogeneous nuclear reactor power plant moderated and cooled by water at supercritical temperature and pressure includes a coolant loop having means for supplying feed water through the reactor for converting it to live steam and a heat exchanger of the indirect type connected to the feed water supply means upstream of the reactor. Also provided are means for conducting a portion of the live steam from the reactor to the heat exchanger for preheating the feed water passing through the heat exchanger and for producing condensate therein, as well as a conduit connected between the heat exchanger and the feed water supply means at a location thereof upstream of the heat exchanger, and a pump connected in the conduit for returning condensate through the conduit from the heat exchanger to the feed water supply means for preheating the feed water in the supply means.

---

My invention relates to power plants and more particularly to heterogeneous nuclear reactor power plants.

A heterogeneous nuclear reactor of the pressure vessel type, which is moderated by water and cooled by water at supercritical pressure and supercritical temperature can operate together with a turbine either in a direct circuit or in an indirect circuit. In addition to being controlled by control rods, the reactor can be controlled by varying the moderator temperature which is effected by suitably adjusting the quantity of moderator fluid flowing through the reactor. For further details regarding such reactor control reference can be had to application Ser. No. 477,733, filed Aug. 6, 1965, of which I am a joint applicant.

It has been found, however, that the operation of such a supercritical nuclear reactor power plant proves to be more favorable when the feed water is preheated by a portion of the live steam produced in the reactor proper.

It is accordingly an object of my invention to improve the power plant output of a supercritical heterogeneous nuclear reactor.

It is also an object of my invention to provide means for operating a supercritical reactor more favorably than heretofore.

With the foregoing and other objects in view, in accordance with my invention, I preheat the feed water with the aid of a heat exchanger and by means of a portion of the live steam produced in the reactor this portion of steam, after the temperature thereof has been reduced in the heat exchanger, being then returned as condensate to the coolant circuit at the feed water inlet side of the heat exchanger, with the aid of a pump.

Other features which are considered as characteristic for the invention are set forth in the appended claim.

Although the invention is illustrated and described herein as embodied in heterogeneous nuclear reactor power plant, it is nevertheless not intended to be limited to the details shown, since various modifications and structural changes may be made therein without departing from the spirit of the invention and within the scope and range of equivalents of the claim.

The construction and method of operation of the invention, however, together with additional objects and advantages thereof will be best understood from the following description when read in connection with the accompanying drawing consisting of a single figure that is a schematic view or circuit diagram of the power plant constructed in accordance with my invention.

There is shown in the figure a nuclear reactor 1 of a type, for example, such as is described and illustrated in the aforementioned copending application Ser. No. 477,733, to which is connected a moderator supply conduit 43 wherein a moderator control valve 42 is located. A coolant supply conduit 45 is connected between the reactor 1 and a heat exchanger 15 for preheating feed water supplied thereto, and a coolant control valve 42 is provided in the coolant supply conduit 45. The moderator supply conduit 43 connects with the coolant supply conduit 45 between the coolant control valve 42 and the heat exchanger 15. Live steam is supplied to the heat exchanger 14 by the branch conduit 11 extending from the conduit 16 which leads from the reactor 1 to the schematically shown turbine stages, and condensate is returned by the pump 14 from the heat exchanger 15 to the feed water supply conduit 17 leading to the heat exchanger 15. The other components of the system illustrated in the circuit diagram of the figure are conventionally shown and readily identifiable. They moreover form no part of the invention proper of the instant application and therefore are believed not to require specific identification by reference characters or further description.

The purpose and function of the aforedescribed plant are as follows:

By increasing the inlet temperature of the coolant in the reactor, the enthalpy of the coolant is raised. For a constant outlet temperature of the reactor, or outlet enthalpy of the coolant, a larger coolant throughput through the reactor is necessary, according to the given output. This is, however, associated with a higher flow velocity and therewith a higher heat transfer coefficient $\alpha$ between the coolant and the fuel elements of the reactor. This increase of the heat transfer coefficient effects a reduction in the wall temperature of the coolant-containing tubes in the reactor when the output is kept constant or effects a corresponding increase in the specific power output of the reactor when the surface temperatures are kept constant.

Obviously, the live steam employed for heating the feed water can also be fed directly into the feed water supply conduit. Then, however, in order to overcome the pressure difference, a blower having a very high output must be provided because the necessary blower output N is substantially proportional to the product of the supplied volume V and the pressure difference $\Delta p$. Since the supplied volume V corresponds to the product of the specific volume $v$ and the mass G (which is constant), the specific volume $v$ is reduced by about $\frac{1}{10}$ by the cooling action in the heat exchanger, and thereby the required pump power output is accordingly reduced. By this means, it is possible to reduce the pump output to a tolerable value.

By the foregoing means it is also apparent that it is possible either to increase the output of the reactor or reduce the surface temperature of the fuel elements. Both of these possibilities are of great significance for a supercritical nuclear reactor, because they are accompanied by essential simplifications and facilitations with respect to the size of the reactor and the stress applied to the structural material thereof.

I claim:
1. In a heterogeneous nuclear reactor power plant moderated by water and cooled by water at supercritical pres- sure and supercritical temperature, a coolant loop comprising means for supplying feed water through the reactor for converting it to live steam, heat exchanger means of the indirect type connected to said feed water supply means upstream of the reactor, means for conducting a portion of the live steam from the reactor to said heat exchanger means for preheating the feed water passing through said heat exchanger and for producing condensate therein, conduit means connected between said heat exchanger means and said feed water supply means at a location thereof upstream of said heat exchanger means, and pump means connected in said conduit means for returning condensate through said conduit means from said heat exchanger means to said feed water supply means for preheating the feed water in said supply means.

References Cited

UNITED STATES PATENTS

| | | | |
|---|---|---|---|
| 3,047,479 | 7/1962 | Young et al. | 176—60 |
| 3,103,917 | 9/1963 | Bauer et al. | 176—60 |
| 3,108,938 | 10/1963 | Nettel et al. | 176—60 |
| 3,167,480 | 1/1965 | West et al. | 176—56 |

FOREIGN PATENTS

| | | |
|---|---|---|
| 1,184,886 | 2/1959 | France. |

REUBEN EPSTEIN, Primary Examiner

U.S. Cl. X.R.

176—60